(12) United States Patent
Efimov et al.

(10) Patent No.: US 8,043,087 B2
(45) Date of Patent: Oct. 25, 2011

(54) METHODS AND APPARATUS FOR THERMAL DEVELOPMENT OF LARGE AREA SOLIDS

(75) Inventors: Oleg Efimov, Thousand Oaks, CA (US); David Hammon, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 1414 days.

(21) Appl. No.: 11/548,447

(22) Filed: Oct. 11, 2006

(65) Prior Publication Data

US 2008/0145282 A1 Jun. 19, 2008

(51) Int. Cl.
*F27B 3/06* (2006.01)
(52) U.S. Cl. ............... 432/124; 432/122; 432/157
(58) Field of Classification Search .......... 219/443.1, 219/444.1; 432/5, 6, 7, 9, 34, 45, 157, 160, 432/122, 124, 258
See application file for complete search history.

(56) References Cited

U.S. PATENT DOCUMENTS

| | | | |
|---|---|---|---|
| 1,582,335 A | | 4/1926 | Clark |
| 2,237,659 A * | | 4/1941 | Edwards ................ 432/32 |
| 3,295,843 A | | 1/1967 | McMaster et al. |
| 3,807,829 A * | | 4/1974 | Close ................ 359/19 |
| 3,822,980 A * | | 7/1974 | Graeper ................ 425/429 |
| 3,940,242 A * | | 2/1976 | Matsumura et al. ....... 432/124 |
| 3,947,242 A * | | 3/1976 | McMaster et al. ....... 432/122 |
| 4,098,223 A * | | 7/1978 | Ertl et al. ................ 118/725 |
| 5,684,611 A | | 11/1997 | Rakuljic et al. |
| 6,211,488 B1 | | 4/2001 | Hoekstra et al. |
| 6,250,914 B1 * | | 6/2001 | Katsumata et al. ........ 432/5 |
| 6,560,020 B1 | | 5/2003 | Kramer |
| 6,586,141 B1 | | 7/2003 | Efimov et al. |
| 6,670,576 B2 | | 12/2003 | Troitski et al. |
| 6,673,497 B2 | | 1/2004 | Efimov et al. |
| 6,686,290 B2 | | 2/2004 | Ohmukai |
| 6,763,686 B2 * | | 7/2004 | Carpenter et al. ........ 65/413 |
| 6,765,724 B1 | | 7/2004 | Kramer |
| 6,782,207 B1 | | 8/2004 | Efimov |
| 6,940,047 B2 * | | 9/2005 | van Kesteren et al. ...... 219/390 |
| 6,965,472 B2 | | 11/2005 | Efimov et al. |
| 7,062,126 B2 * | | 6/2006 | Kersey et al. ............ 385/37 |
| 7,088,483 B1 | | 8/2006 | Efimov |
| 7,514,651 B2 * | | 4/2009 | Popeil et al. ............ 219/392 |
| 7,515,781 B2 * | | 4/2009 | Chimenti et al. ........ 385/12 |
| 2002/0045104 A1 | | 4/2002 | Efimov et al. |
| 2002/0088350 A1 * | | 7/2002 | Backus et al. ........... 99/419 |

(Continued)

FOREIGN PATENT DOCUMENTS

JP 2003202401 7/2003

(Continued)

OTHER PUBLICATIONS

Oleg M. Efimov, "Method and Apparatus for Recoding Holographic Diffraction Gratings", U.S. Appl. No. 11/281,034, filed Nov. 17, 2005.

(Continued)

*Primary Examiner* — Gregory A Wilson
(74) *Attorney, Agent, or Firm* — Daly, Crowley, Mofford & Durkee, LLP

(57) ABSTRACT

Methods and apparatus to rotate a sample about first and second axes in a heat chamber to obtain a desired homogeneous modification of properties of the sample and maintain a surface figure.

18 Claims, 5 Drawing Sheets

U.S. PATENT DOCUMENTS

| | | | |
|---|---|---|---|
| 2005/0115945 A1* | 6/2005 | Kesteren et al. | 219/390 |
| 2005/0226560 A1* | 10/2005 | Kopp et al. | 385/37 |
| 2008/0047950 A1* | 2/2008 | Quach et al. | 219/444.1 |
| 2008/0145282 A1* | 6/2008 | Efimov et al. | 422/173 |
| 2009/0280449 A1* | 11/2009 | Dungey et al. | 432/11 |

FOREIGN PATENT DOCUMENTS

| | | |
|---|---|---|
| JP | 2007277045 | 10/2007 |

OTHER PUBLICATIONS

Leonid B. Glebov, Volume Diffractive Elements in Photosensitive Inorganic Glass for Beam Combining, 2001, pp. 1-4, School of Optics/CREOL, University of Central Florida, Orlando, Florida.

Notification Concerning Transmittal of International Preliminary Report on Patentability (Chapter 1 of the Patent Cooperation Treaty) dated Apr. 23, 2009, International Preliminary Report on Patentability dated (Chapter 1 of the Patent Cooperation Treaty) Apr. 23, 2009, and the Written Opinion of the International Searching Authority, (PCT Rule 43bis.1) dated Sep. 3, 2008, PCT/US2007/021321.

PCT/US2007/021321 Partial International Search Report dated Jun. 6, 2008 (PCT Article 17(3)(a) and Rule 40.1).

T. Cardinal, O.M. Efimov, H.G. Francois-Saint-Cyr, L.B. Glebov, L.N. Glebova, V.I. Smirnov, Comparative Study of Photo-Induced Variations of X-ray Diffraction and Refraction Index In Photo-Thermo-Refractive Glass, Journal of Non-Crystalline Solids 325 (2003) pp. 275-281.

Notification of transmittal of the International Search Report dated Mar. 9, 2008, PCT/US2007/021321.

The International Search Report, International filing date of Apr. 10, 2007, PCT/US2007/021321.

Written Opinion of the International Searching Authority dated Mar. 9, 2008, PCT/US2007/021321.

* cited by examiner

METHODS AND APPARATUS FOR THERMAL DEVELOPMENT OF LARGE AREA SOLIDS

BACKGROUND

There are various known systems and methods that attempt to create homogeneous distribution of an average temperature inside solids requiring relatively long thermal development (TD) times. Examples of such processes include annealing of solids to remove stresses and thermal development of glass materials and crystal materials to fix recorded Bragg Gratings (BGs), e.g., distribution of refractive index modulation. In the latter case, an additional requirement to the process is the conservation of the sample flatness. Deviations from the original shape result in the variation of the angle of beam incidence on the Bragg grating and in the impairment of total diffraction efficiency. Conventional industrial furnaces are limited to providing a temperature gradient of about one degree Celsius in a relatively restricted volume. In addition, such furnaces do not allow measurement of sample shape conservation. Thermal development of glass samples with homogeneously recorded gratings in such furnaces results in significant degradation of plane surfaces of samples and in relatively low total diffraction efficiency of Bragg gratings even in the case of medium-sized samples—about 25 mm×25 mm.

Most known techniques for long time homogeneous thermal development of solids are based on usage of specialized furnaces with small temperature gradients in a heat chamber. Furnaces with relatively small volume heat chambers provide smaller temperature gradients. Therefore, such furnaces are usually considered for high homogeneous thermal development. Additional equipment placed in a heat chamber results in a volume increase and temperature gradient.

SUMMARY

The present invention provides methods and apparatus to rotate a sample, such as a glass grating, about first and second axes to obtain a desired modulation of a refractive index of the glass while maintaining a surface figure of the grating. A holder secures the grating during thermal processing and minimizes distortion of the grating. With this arrangement, relatively large gratings, e.g., 100 mm×100 mm, can be provided. While the invention is primarily shown and described in conjunction with glass gratings, it is understood that the invention is applicable to materials in general for which it is desirable to have a low temperature gradient and secure a high surface figure during thermal development.

In one aspect of the invention, a method comprises placing a glass diffraction grating in a holder contained in a heat chamber, heating the heat chamber, and rotating the grating about first and second axes for obtaining a desired modulation of a refractive index of the glass.

The method can further include one or more of the following features: the first and second axes are substantially perpendicular, the grating is a Bragg grating, the grating has a width of at least 100 mm, the grating has a length of at least 100 mm, the heat chamber is heated to at least 480 degrees Celsius, the holder includes first and second opposed plates to hold the grating, and a bias mechanism to bias the first and second plates against the grating.

In another aspect of the invention, a system comprises a heat chamber, a holder to hold a glass diffraction grating in the heat chamber, a rotation mechanism to rotate the grating about first and second axes for obtaining a desired modulation of a refractive index of the glass.

The system can further include one or more of the following features: the first and second axes are substantially perpendicular, the grating is a Bragg grating, the grating has a width of at least 100 mm, the grating has a length of at least 100 mm, the holder includes first and second opposed plates to hold the grating, and a bias mechanism to bias the first and second plates against the grating.

In a further aspect of the invention, a holder device comprises first and second holder plates to hold a glass diffraction grating in a heat chamber, a first pressure plate adjacent to the first holder plate and a second pressure plate adjacent to the second holder plate, a bias mechanism to apply pressure to the first pressure plate for pressuring the first and second holder plates against the grating to secure the grating as the grating is rotated about first and second axes in a heat chamber for obtaining a desired modulation of a refractive index of the glass.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
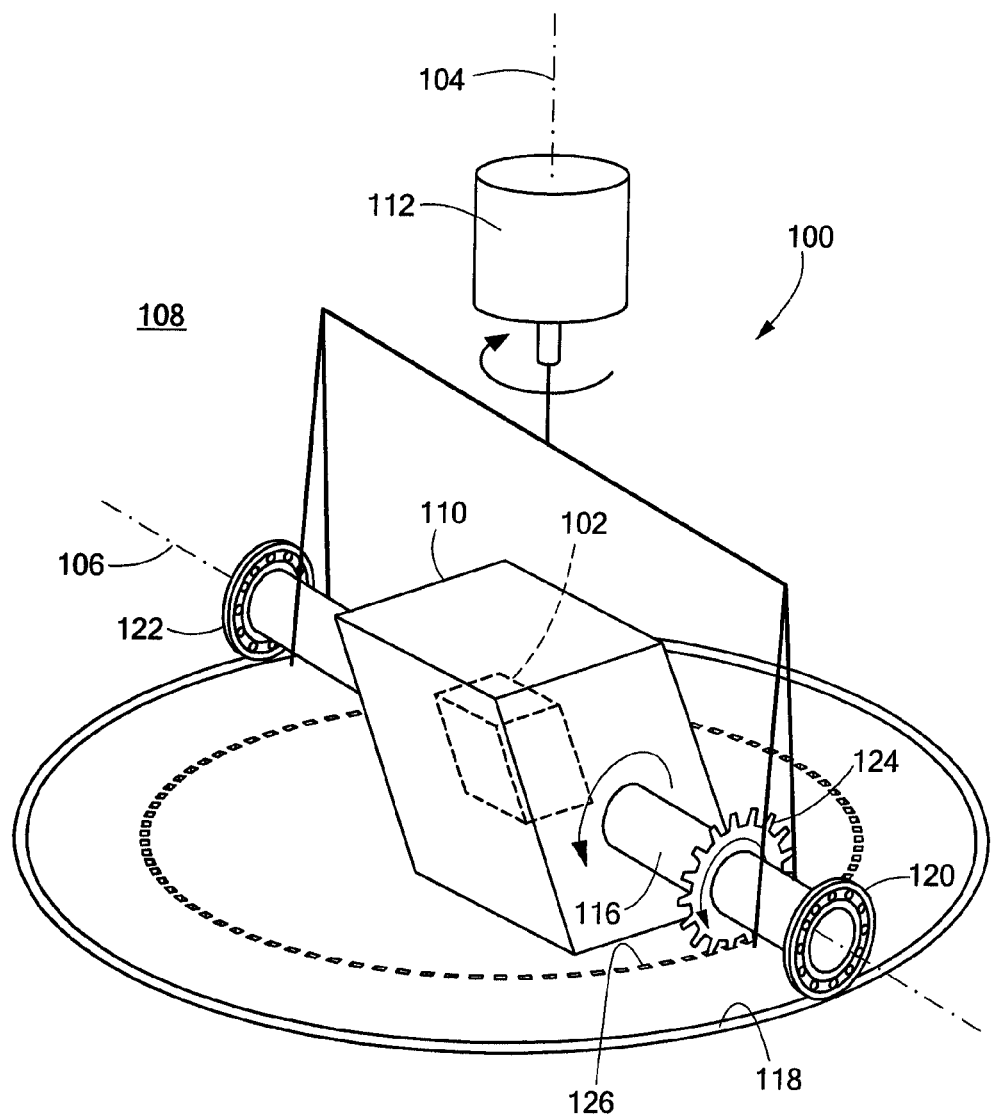
FIG. 1 is a schematic representation of a system to rotate a glass grating about multiple axes in accordance with embodiments of the present invention.

Embodiments of the invention provide methods and apparatus achieving relatively homogeneous distribution of average temperature across a solid during thermal development (TD) to conserve, as much as possible, an identical material modification over the solid and enable a high-quality surface figure to be maintained even if a material softens somewhat under elevated temperature. In general, the sample, e.g., a glass grating, is rotated about first and second axes, which can be perpendicular, inside a heat chamber to equalize radiant heating and gravity action across the sample. In one embodiment, to maintain the surface figure, the samples are placed between high-quality plates under relatively small pressure to secure the sample in the holder. In addition, rotation of the sample promotes air temperature equalization throughout a heat chamber.

It is understood that surface figure refers to the deviation from the ideal surface. It is usually specified in terms of waves peak-to-valley at λ=633 nm (e.g.: λ/2, λ/10, λ/20, etc.).

The inventive systems and methods are useful in the thermal development of relatively large-sized Bragg gratings (BG) recorded in photosensitive glass, which are generally heated to temperatures over 500 degrees Celsius after ultraviolet (UV) exposure to manifest a refractive index change.

In general, long time thermal development is about 1-2 hours. However, the total development time including the time of heating, holding at high temperature, and cooling is of about six or more hours. It is understood that these times can vary and are not intended to be limiting, but rather to convey a general sense of processing duration.

As is known in the art, there are drawbacks to conventional thermal processing. During long-time thermal processing, even a rather small temperature gradient (i.e., about one degree Celsius) in the glass resulted in a considerable difference in refractive index modification and in diffraction efficiency in different parts of a Bragg grating. In addition, the glass lost hardness at temperatures over about 500 degrees Celsius. Thus, only relatively small-sized gratings could be developed (i.e., recorded and thermal developed) in glass with high diffraction efficiency. Recording high-efficient large-sized Bragg gratings was not possible because of distortion of their plane shapes during thermal processing and inhomogeneous refractive index modification as a result of temperature gradient in large furnaces.

In contrast, the inventive methods and apparatus overcome these obstacles. Moreover, it can be successfully used for a treatment of a variety of solids requiring long-time thermal processing that are sensitive to temperature gradients and/or gravity loads. The diffraction efficiency of a Bragg grating recorded in large-sized samples of about 50 mm×50 mm was more than 97% for a beam of about 45 mm in diameter. For samples of about 100 mm×100 mm, recording was achieved with diffraction efficiency of about 94% for a square beam of about 100 mm×100 mm. Further, the samples did not require any additional mechanical treatment after thermal processing.

The Bragg gratings produced using the inventive systems and methods are useful in a variety of applications. For example, the Bragg Gratings can be used in angularly addressed holographic optical elements for the purpose of angular magnification of beam steering systems. Basic requirements of these optical elements are high diffraction efficiency and homogeneity over a large area. To satisfy these requirements it is necessary to provide high homogeneous recording of Bragg gratings over a whole area, high homogeneous distribution of temperature during thermal development, and conservation of hologram flatness.

Figure 1A:
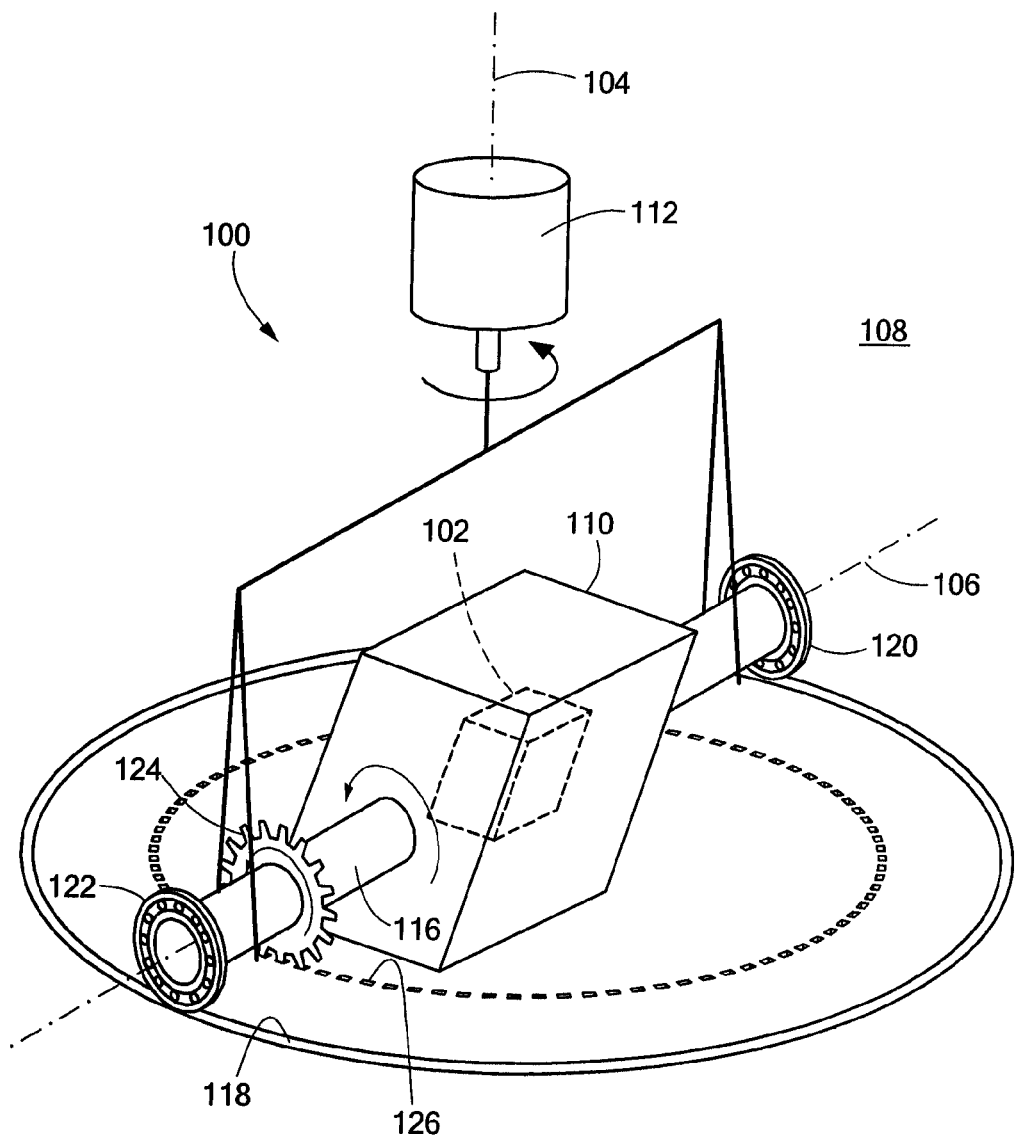
FIG. 1A is a schematic representation of the system of FIG. 1 shown after rotation.

FIG. 1 shows a system 100 to provide uniform heating of samples 102 in accordance with exemplary embodiments of the invention. The system 100 provides rotation of the sample 102 about first and second perpendicular axes 104, 106 within a heat chamber 108 to heat the sample to a desired temperature. FIG. 1A shows the system 100 after rotation about the first and second axes 104, 106 with respect to the position shown in FIG. 1.

A sample holder 110 is rotated about the first axis 104 by a rotation mechanism 112 and rotated about the second axis 106 by a first gear 124 rolling on a second gear 126, shown as a larger round gear. It is understood that the rotation mechanism 112 can be provided in a wide variety of types of suitable mechanisms. It is understood that gear ratios can be selected to achieve a desired amount of rotation about the second axis 106 with respect to the first axis 104.

In addition, in other embodiments separate rotation mechanisms are provided for independent control of rotation about the first and second axes 104, 106. In general, the rotation mechanism(s) should provide smooth, continuous movement in high temperature heat chambers.

It is understood that the speed of rotation about the first and second axes 104, 106 can vary to meet the needs of a particular application. In one particular embodiment, the speed of rotation about the first axis 104 is about 0.2-0.3 rpm and the speed of rotation about the second axis 106 is about 1-1.5 rpm.

It is understood that faster rotation increases the homogeneous distribution of temperature over the sample; however, the rate of the thermal process is rather slow and therefore, it is not believed that faster rotation will result in any practical differences in the sample. Another parameter may be connected with a direction of temperature gradient. That is, if the gradient is directed vertically (bottom-top), the rotation around the horizontal axis should be faster for temperature homogenization. If it is directed horizontally, the faster rotation should be around the vertical axis.

In the illustrated embodiment, the sample holder 110 is coupled to a shaft 116 rotating about the second axis 106. A guide rail 118 provides a surface for bearings 120, 122. Rotation of a first gear 124, which is engaged with a second gear 126, results in the circular motion of the shaft 116 about the second axis 106.

In an exemplary embodiment, the first and second gears 124, 126 have rigid joints with the shaft 116 and the guide rail 118 respectively, so that rolling motion of the first gear 124 along the second gear 126 results in three-dimensional rotation of the sample holder 110 around the first and second axes 104, 106.

It is understood that a wide variety of devices having suitable heat chambers can be used. In one particular embodiment, the furnace is provided as part no. Lindberg/Blue M BF51866A, Kendro Laboratory Products, inc., Asheville, N.C. 28804. In another embodiment, the furnace is provided as part no. GS1714, L&L Special Furnace Co., Inc., Aston, Pa. 19014.

It is understood that the relationship of the first and second axes can vary. In one embodiment, the axes are perpendicular. In other embodiments, the axes are aligned in other relationships. In another embodiment, the sample is rotated about a third axis to obtain a desired pattern of positional displacement to meet the needs of a particular application. In addition, while the invention is primarily shown and described in conjunction with the thermal processing of photosensitive glass for Bragg gratings, it is understood that other embodiments are contemplated to process other types of materials.

The sample holder should allow keeping a high-quality surface figure of samples made from a photosensitive glass. One type of photosensitive glass is disclosed in U.S. Pat. No. 6,586,141, which is incorporated herein by reference. Samples were exposed with an interference pattern from two UV beams before thermal development. Latent images of BGs were imprinted into the glass. To transfer these images into the actual refractive grating, i.e., to obtain the modulation of refractive index of glass, high-temperature (e.g., >480° C.) thermal development was required. However, such temperatures can soften the glass samples somewhat.

Figure 2A:
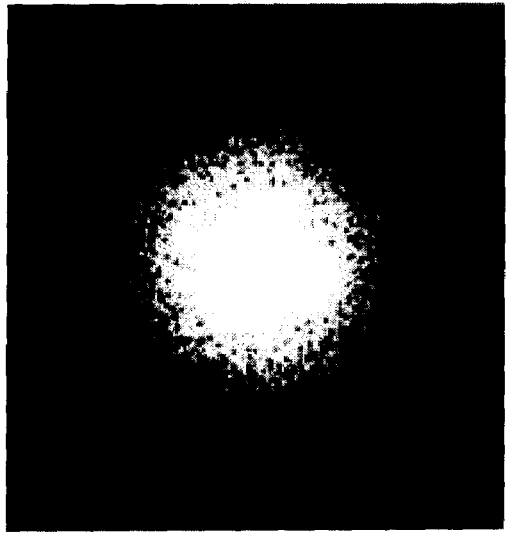
FIG. 2A is a pictorial representation of an image of a Gaussian beam reflected from a front surface of an original glass sample.
Figure 2B:
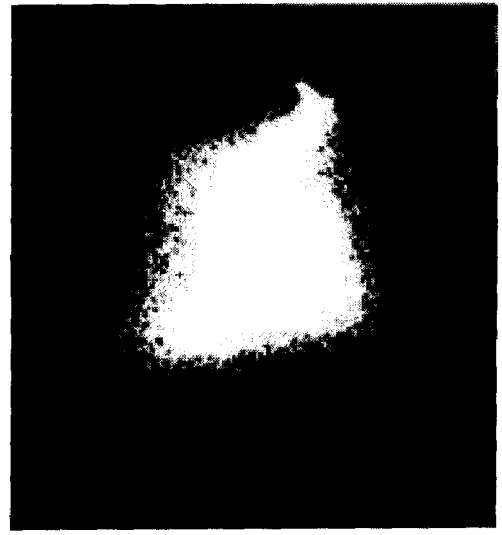
FIG. 2B is a pictorial representation of an image of a Gaussian beam reflected from a front surface of a glass sample after prior art thermal development techniques.
Figure 2C:
FIG. 2C is a pictorial representation of an image of a Gaussian beam reflected from a front surface of a glass sample after prior art thermal development techniques.
Figure 2D:
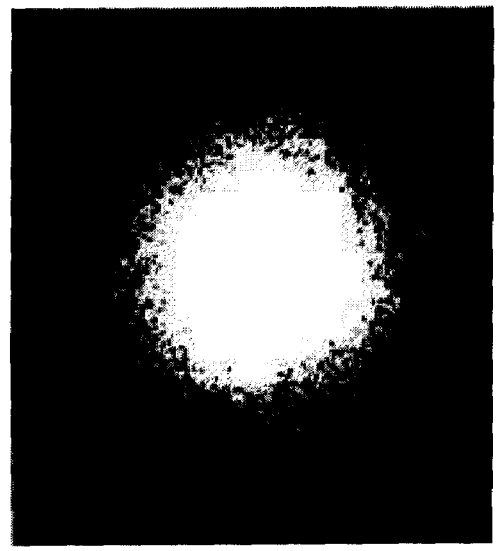
FIG. 2D is a pictorial representation of an image of a Gaussian beam reflected from a front surface of a glass sample after thermal development in accordance with exemplary methods and apparatus of the invention.

FIGS. 2A-D show images of a Gaussian beam with a diameter of 40 mm (FW1/e²M) reflected from the front surface of glass samples with sizes of 50 mm×50 mm before thermal processing (FIG. 2A) and after thermal development (FIG. 2B-D). One can see in FIGS. 2B and 2C that thermal development by standard methods led to significant surface deterioration due to both local and total deformation across the whole sample area. As a rule, the flat samples were bent as a whole after thermal development and obtained convex or concave shape depending on which side was up in the heat chamber for the samples of FIGS. 2B and 2C.

Using known thermal processing techniques, as shown in FIGS. 2B and 2C, it can be seen that distortions of holograms resulted in the variation of Bragg angle across recorded area. Therefore, high diffraction efficiency, i.e., close to 100%, could be reached just for small areas of Bragg gratings using conventional thermal development techniques. Diffraction efficiency of large-sized Bragg gratings (about 100 mm×100 mm) using conventional thermal development could not exceed a value of about 80% even after sample re-polishing because of the volumetric deterioration of the hologram structure during thermal development.

As shown in FIG. 2D, the inventive thermal development methods and apparatus overcome limitations of conventional systems and techniques to enable thermal development for larger samples.

Figure 3:
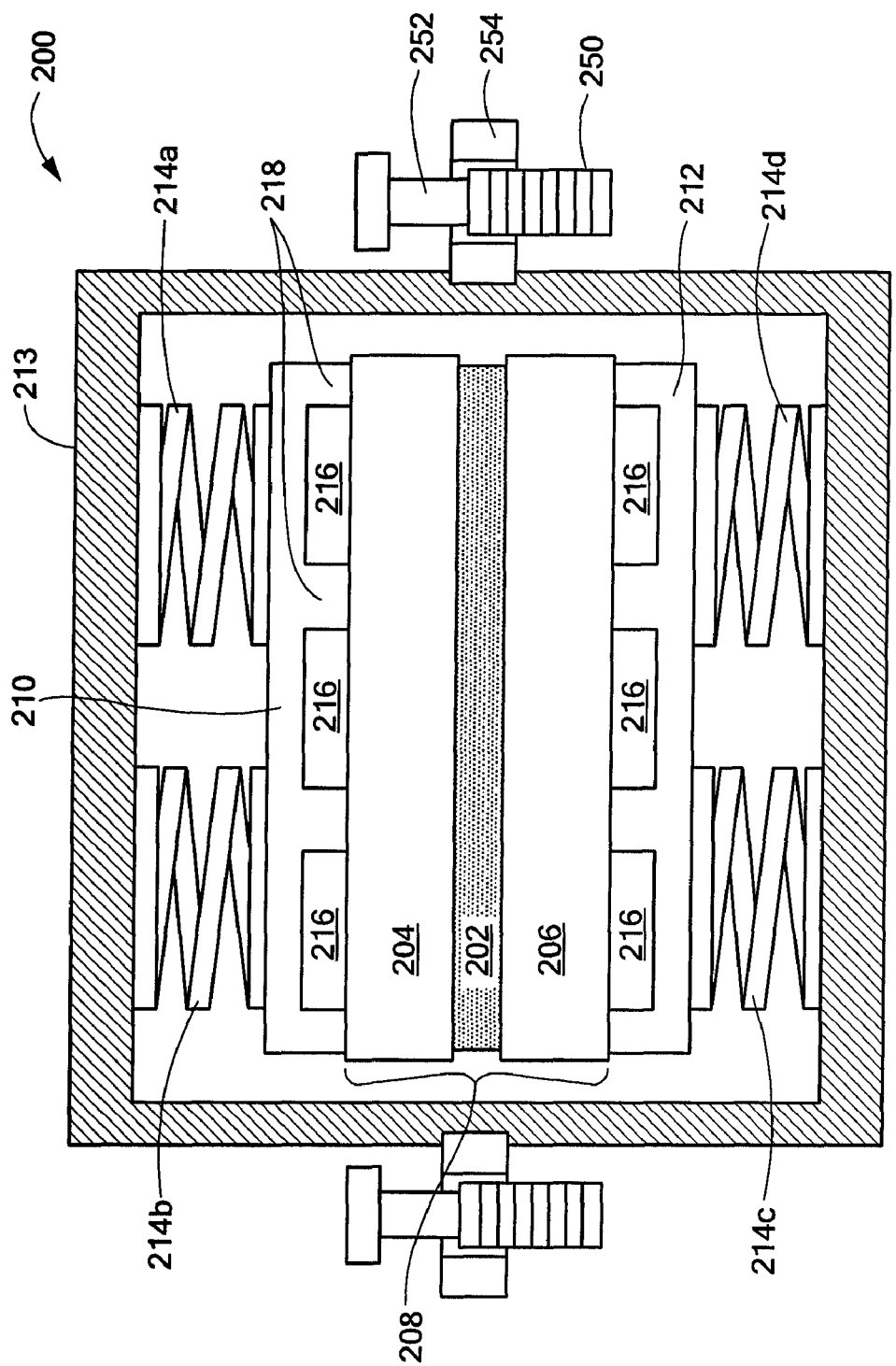
FIG. 3 is a schematic depiction of an exemplary holder that can form a part of the system of FIG. 1.

FIG. 3 shows an exemplary embodiment of a sample holder 200 that can be used in the system 100 of FIG. 1. A Bragg grating was recorded in a high-quality flat glass sample. The sample 202 was placed between first and second high-quality flat holder plates 204, 206 made from fused silica (e.g., Corning part no. 7980) having a softening point of about 1585 degrees Celsius. Thus, the holder plates 204, 206 do not appreciably change in hardness at the temperature of Bragg grating thermal development (e.g., about 500-520 degrees Celsius). The plate/sample sandwich 208 was placed between first and second pressure plates 210, 212. In one embodiment, the pressure plates 210, 212 are made from stainless steel. The sandwich 208 is contained in a case 213.

The pressure plates 210, 212 pass pressure from temperature-resistant springs 214a-d applying pressure on the fused silica holder plates 204, 206. In one embodiment, the pressure plates 210, 212 have a geometry that includes cutout regions 216 to allow air penetration in the space between the metal pressure plates 210, 212 and the fused silica holder plates 204, 206 to facilitate temperature homogenization inside the sandwich. With the cutout regions 216, the pressure plates 210, 212 have contact points 218 contacting the holder plates 204, 206.

To ensure a desired surface quality during development, the pressure provided by the springs 214 should have a 'proper' value. Excessive pressure results in damage/modification of samples while the insufficient pressure will allow the sample to slide out of the sandwich. The desired pressure is different for different materials and depends on their physical parameters and the conditions of thermal development.

In an exemplary embodiment, the holder 200 includes a pressure adjustment mechanism 250. In one particular embodiment, the holder includes screws 252 and spacers 254 to control the distance between the sandwich 208 and the case 213 for determining the amount of pressure applied by the springs.

It is understood that a wide variety of mechanisms other than springs can be used to apply pressure to the plates, as will be readily apparent to one of ordinary skill in the art. In addition, while a manual device is shown, it is understood that an electronically controlled system can be provided having software control mechanisms to apply the desired level of pressure to the sample. For example, a feedback loop can be used to measure and apply an optimal amount of pressure to secure the grating in position while minimizing excess pressure. Further, it will be readily apparent that a variety of suitable materials can be used for the holder and pressure plates without limitation to the exemplary embodiments described herein.

Thermal development of the Bragg Gratings using the inventive systems and techniques allows reaching relatively high total diffraction efficiency of larger-sized holograms. Larger-sized gratings are desirable in a wide variety of applications, such as communication, narrowband detection, astronomy, interferometry, spectroscopy, beam control, etc.

Figure 4:
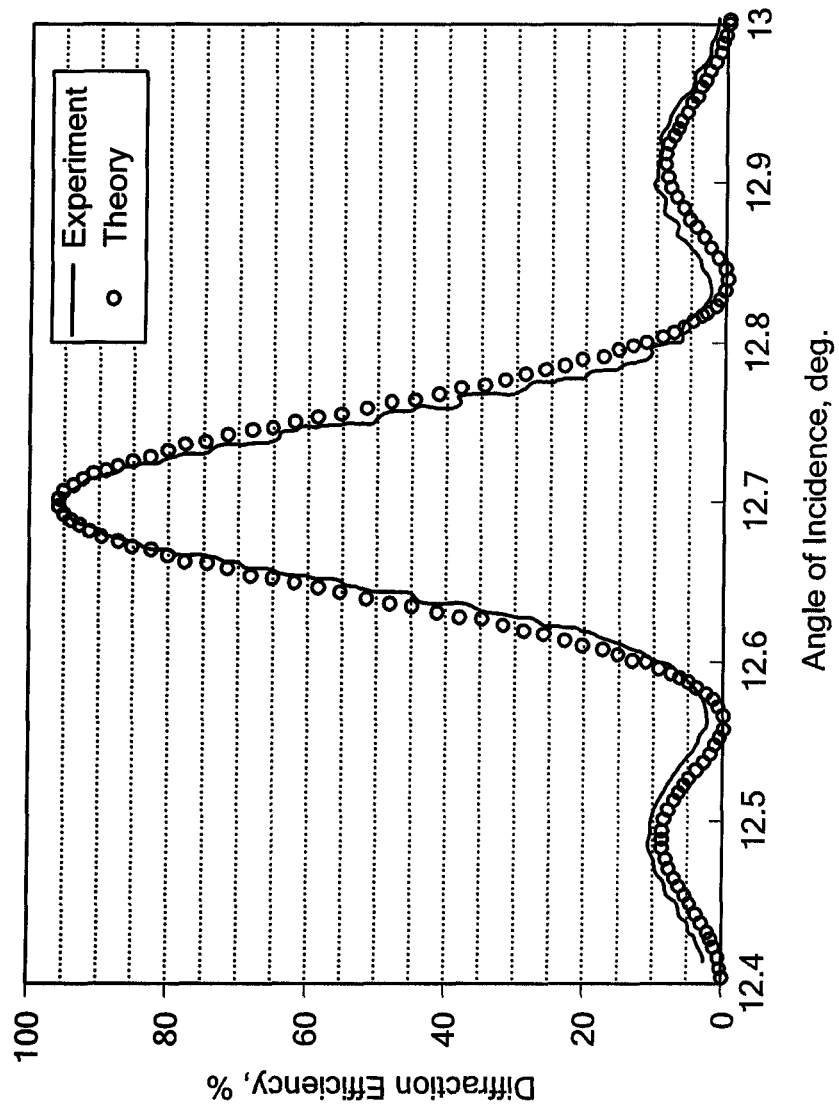
FIG. 4 is a graphical depiction of angular dependence of diffraction efficiency of a Bragg grating having a 50 mm×50 mm size processed in accordance with exemplary embodiments of the invention.

FIG. 4 shows the angular dependence of a Bragg grating generated from the inventive system at a wavelength of 1550 nm with a size of 50 mm×50 mm. It was measured with Gaussian beam having a diameter of 40 mm ($FW1/e^2M$). As can be seen, the diffraction efficiency of the inventive Bragg grating exceeded ninety-seven percent. Moreover, the Bragg grating with a size of 100 mm×100 mm at the same wavelength was recorded and thermal developed. The diffraction efficiency of this grating measured with a square beam of 100 mm×100 mm was of 94%. The optical inhomogeneities presented in the volume of original glass had not allowed reaching the higher diffraction efficiency. It should be noted that the Bragg gratings should not be subjected to additional treatment after thermal development.

The image of the Gaussian beam reflected from the front surface of the developed Bragg grating with a size of 50 mm×50 mm is shown in FIG. 2D. One can see that the reflected beam has a shape similar to the shape of original beam (FIG. 2A). It has small distortions basically connected with local surface deterioration because of residual inhomogeneity of the glass used. These distortions should not prevent reaching high diffraction efficiency of Bragg gratings and can be easily removed by re-polishing if an extremely high quality of transmitted wavefront is required.

Figure 5:
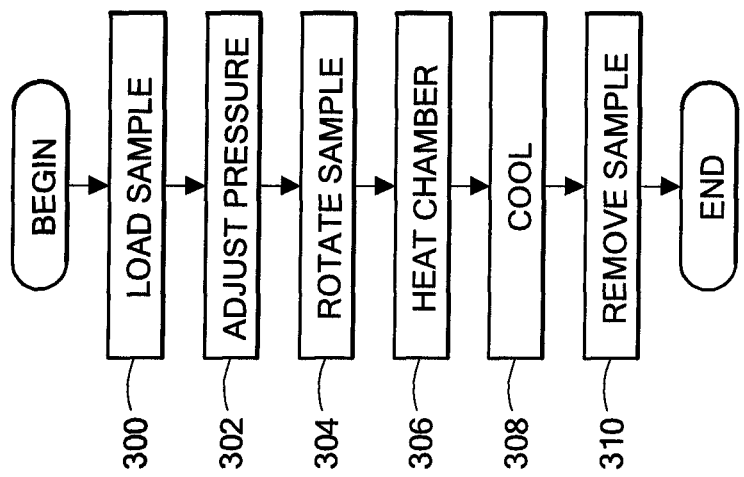
FIG. 5 is a flow diagram showing an exemplary sequence of steps to provide a grating thermal development in accordance with exemplary embodiments of the invention.

FIG. 5 shows an exemplary sequence of steps for thermal development of a sample in accordance with exemplary embodiments of the invention. In step 300, a sample is loaded into the holder in the heat chamber of the rotator system. The pressure on the sample is adjusted to a desired level based upon the thermal development parameters in step 302. In step 304, the sample is rotated about first and second axes at a predetermined speed for a selected amount of time and in step 306 the heat chamber is heated. In step 308, the heating chamber is cooled in a controlled manner and in step 310 the sample is removed from the heat chamber.

The present invention provides methods and apparatus for multi-dimensional rotation of a sample around two perpendicular axes inside a heat chamber with the samples placed between first and second opposed plates made from a heat-proof material and being under a small pressure enables continuous rotation of the sample. This arrangement provides a number of advantages, as set forth below.

(a) High homogeneous distribution of average temperature across the samples is achieved because the different parts of the sample continuously pass through different temperature zones of the heat chamber while mixing the air by rotating equalizes the temperature throughout the heat chamber;

(b) Rotation of the sample prevents a long-term gravity action in any fixed direction across the sample; and (c) The high quality of plates surrounding the sample during thermal processing keeps a high-quality surface figure of samples even where the sample softens to a small extent.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
    placing a glass sample in a holder contained in a heat chamber, wherein the holder includes first and second opposed plates to hold the glass sample;
    heating the heat chamber;
    rotating the sample about first and second axes for obtaining a desired homogeneous modification of properties of the sample; and
    applying a pressure to the first and second plates against the glass sample.

2. The method according to claim 1, further including heating the heat chamber to at least 480 degrees Celsius.

3. The method according to claim 1, wherein the first and second opposed plates comprise fused silica plates.

4. The method according to claim 1, further including employing a bias mechanism to control the pressure between the first and second plates.

5. The method according to claim 1, wherein the sample is a glass Bragg grating.

6. The method according to claim 1, wherein the sample has a width of least 100 mm.

7. The method according to claim 1, wherein the sample has a length of at least 100 mm.

8. The method according to claim 1, wherein the holder includes first and second opposed plates to hold the grating.

9. A system, comprising:
    a heat chamber;
    a holder to hold a sample in the heat chamber, wherein the holder includes first and second holder plates to hold the sample;
    a rotation mechanism to rotate the sample about first and second axes for obtaining a desired homogeneous modification of properties of the sample; and
    a mechanism to apply a pressure to the first and second holder plates.

10. The system according to claim 9, wherein the first and second axes are substantially perpendicular.

11. The system according to claim 9, wherein the sample is a glass Bragg grating.

12. The system according to claim 9, wherein the sample has a width of least 100 mm.

13. The system according to claim 9, wherein the sample has a length of at least 100 mm.

14. The system according to claim 9, wherein the first and second opposed plates comprise fused silica plates.

15. The system according to claim 9, further including a bias mechanism to control the pressure between the first and second holder plates.

16. A holder device, comprising:
    first and second opposed holder plates to hold a sample in a heat chamber;
    a first pressure plate adjacent to the first holder plate and a second pressure plate adjacent to the second holder plate;
    a bias mechanism to apply pressure to the first pressure plate for pressuring the first and second holder plates against the sample to secure the sample as the sample is rotated about first and second axes in a heat chamber for obtaining a desired homogeneous modification of properties of the sample.

17. The device according to claim 16, wherein the first and second pressure plates include passages to allow air flow between the first and second pressure plates and the first and second holder plates.

18. The device according to claim 16, further including an adjustment mechanism to enable a user to adjust an amount of pressure applied to the sample.

* * * * *